(12) United States Patent
Ayala Vazquez et al.

(10) Patent No.: US 9,742,459 B2
(45) Date of Patent: Aug. 22, 2017

(54) ELECTRONIC DEVICE HAVING SENSORS AND ANTENNA MONITOR FOR CONTROLLING WIRELESS OPERATION

(71) Applicant: Apple Inc., Cupertino, CA (US)

(72) Inventors: Enrique Ayala Vazquez, Watsonville, CA (US); Hongfei Hu, Santa Clara, CA (US); Mattia Pascolini, San Francisco, CA (US); Yuehui Ouyang, Sunnyvale, CA (US); Salih Yarga, Sunnyvale, CA (US); Yijun Zhou, Sunnyvale, CA (US); Erdinc Irci, Sunnyvale, CA (US); Jayesh Nath, Milpitas, CA (US); Ming-Ju Tsai, Cupertino, CA (US); Matthew A. Mow, Los Altos, CA (US); Liang Han, Sunnyvale, CA (US); James G. Judkins, Campbell, CA (US); Robert W. Schlub, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 154 days.

(21) Appl. No.: 14/283,039

(22) Filed: May 20, 2014

(65) Prior Publication Data

US 2015/0341073 A1 Nov. 26, 2015

(51) Int. Cl.
*H04B 1/04* (2006.01)
*H01Q 11/12* (2006.01)
(Continued)

(52) U.S. Cl.
CPC ............. *H04B 1/40* (2013.01); *H04B 1/0458* (2013.01); *H04B 1/18* (2013.01)

(58) Field of Classification Search
CPC ........ H04B 1/40; H04B 1/3822; H04B 1/406; H04B 1/44; H04B 1/54; H04B 1/0458;
(Continued)

(56) References Cited

U.S. PATENT DOCUMENTS 7,633,378 B2 12/2009 Rodgers et al.
7,930,010 B2 4/2011 Johansson et al.
(Continued)

OTHER PUBLICATIONS

Jadhav et al., U.S. Appl. No. 14/201,620, filed Mar. 7, 2014.
Schlub et al., U.S. Appl. No. 13/865,578, filed Apr. 18, 2013.
Mow et al., U.S. Appl. No. 14/310,240, filed Jun. 20, 2014.

*Primary Examiner* — Nhan Le
(74) *Attorney, Agent, or Firm* — Treyz Law Group, P.C.; G. Victor Treyz; Joseph F. Guihan (57) ABSTRACT

An electronic device may be provided with wireless circuitry. Control circuitry may be used to adjust the wireless circuitry. The wireless circuitry may include an antenna that is tuned using tunable components. The control circuitry may gather information on the current operating mode of the electronic device, sensor data from a proximity sensor, accelerometer, microphone, and other sensors, antenna impedance information for the antenna, and information on the use of connectors in the electronic device. Based on this gathered data, the control circuitry can adjust the tunable components to compensate for antenna detuning due to loading from nearby external objects, may adjust transmit power levels, and may make other wireless circuit adjustments.

19 Claims, 6 Drawing Sheets

(51) Int. Cl.
*H04B 1/40* (2015.01)
*H04B 1/18* (2006.01)

(58) Field of Classification Search
CPC . H04B 1/18; H03H 2/006; H03H 7/40; H03H 5/10
USPC .......... 455/77, 78, 79, 82, 120, 121
See application file for complete search history.

(56) References Cited

U.S. PATENT DOCUMENTS

| | | | |
|---|---|---|---|
| 2003/0176179 A1* | 9/2003 | Hersey | G06K 7/10346 455/334 |
| 2003/0210203 A1* | 11/2003 | Phillips | H01Q 1/362 343/850 |
| 2009/0109117 A1* | 4/2009 | Johansson | H04B 1/0458 343/876 |
| 2011/0250928 A1 | 10/2011 | Schlub et al. | |
| 2013/0273870 A1 | 10/2013 | Shi | |
| 2013/0331042 A1* | 12/2013 | See | H04W 52/367 455/77 |
| 2014/0118190 A1 | 5/2014 | Mendolia | |

\* cited by examiner

| DEVICE STATE | CONNECTOR A | CONNECTOR B | CONNECTOR C | SENSOR S1 | SENSOR S2 | ANTENNA FEEDBACK | ANTENNA SETTING |
|---|---|---|---|---|---|---|---|
| MODE1 | IN USE; ACCESSORY TYPE UNKNOWN | IN USE; ACCESSORY TYPE T1 | NOT IN USE | D1 | D2 | M1, PH1 | SETTING 1 |
| MODE2 | NOT IN USE | NOT IN USE | IN USE; ACCESSORY TYPE UNKNOWN | D1' | D2' | M1', PH1' | SETTING 2 |
| ... | | | | | | | |

ELECTRONIC DEVICE HAVING SENSORS AND ANTENNA MONITOR FOR CONTROLLING WIRELESS OPERATION

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It can be challenging to ensure that wireless communications circuitry in an electronic device will perform satisfactorily in alt operating conditions. Environmental effects such as the proximity of external objects in the vicinity of an antenna may detune an antenna. Antennas may also be detuned due to the presence of a connector plugged into a connector port in an electronic device. When an antenna becomes detuned, wireless performance can suffer and wireless communications may be disrupted. Although an electronic device can be designed to reduce sensitivity to the presence of external objects, doing so may add undesired bulk and weight to the device.

It would therefore be desirable to be able to provide improved wireless circuitry for operating electronic devices in various operating environments.

SUMMARY

An electronic device may be provided with wireless circuitry. The wireless circuitry may include one or more antennas that are tuned using tunable components.

Control circuitry may be used to adjust the wireless circuitry. The control circuitry may gather information on the current operating mode of the electronic device. For example, the control circuitry can determine whether a user is making a voice telephone call using an ear speaker in the electronic device. The control circuitry may also gather sensor data such as sensor data from a proximity sensor, accelerometer, microphone, or other sensor. Antenna impedance information for an antenna in the device can be gathered using coupler that is interposed between radio-frequency transceiver circuitry and an antenna. Connectors in the electronic device may be configured to receive external connectors such as digital data connectors and audio plugs. Using connector presence sensors and connector interface circuitry, the control circuitry can gather information on the usage of connectors in the electronic device.

Based on data gathered by the control circuitry regarding connector usage, device operating mode, antenna impedance, and sensor data, the control circuitry can adjust the tunable components for an antenna. For example, the control circuitry can tune an antenna to compensate for antenna detuning due to loading from nearby external objects. The control circuitry may also adjust transmit power levels and may make other wireless circuit adjustments.

DETAILED DESCRIPTION

Figure 1:
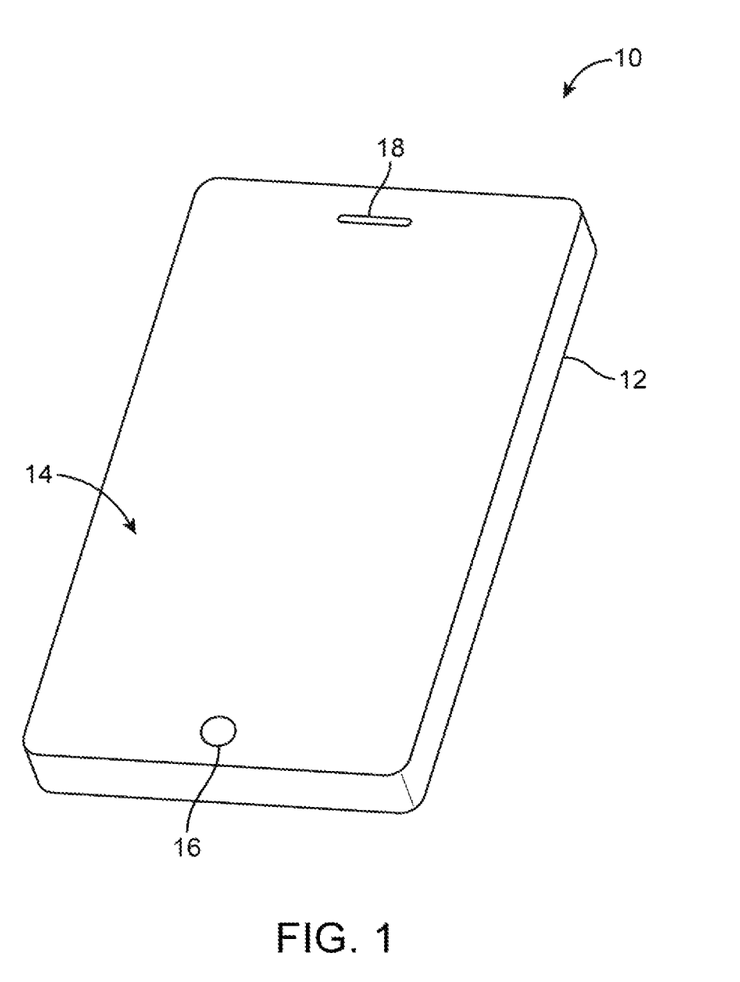
FIG. 1 is a perspective view of an illustrative electronic device with wireless communications circuitry in accordance with an embodiment.

An electronic device such as electronic device 10 of FIG. 1 may contain wireless circuitry. A coupler may be used to tap into a path between a radio-frequency transceiver and an associated antenna. The output from the tap can be used to measure antenna signals being transmitted to the antenna and antenna signals being reflected from the antenna. Processing circuitry within the electronic device may process the tapped antenna signals to produce antenna impedance information. Sensors may also gather information on the operating environment of the electronic device. For example, sensors may be used to determine whether an object is present in the vicinity of an antenna and may be used to determine whether a connector has been plugged into a connector port in the electronic device. Information on the type of connector that has been plugged into the device may also be gathered. A device may monitor the operating status of components within the device. The antenna impedance information, information from the sensors, information on connectors plugged into the device, and the operating status of the device and its components can be used in tuning antennas and otherwise compensating for antenna detuning effects. Other wireless circuit adjustments may also be made based on this information.

Device 10 may contain wireless communications circuitry that operates in long-range communications bands such as cellular telephone bands and wireless circuitry that operates in short-range communications bands such as the 2.4 GHz Bluetooth® band and the 2.4 GHz and 5 GHz WiFi® wireless local area network bands (sometimes referred to as IEEE 802.11 bands or wireless local area network communications bands). Device 10 may also contain wireless communications circuitry for implementing near-field communications, light-based wireless communications, satellite navigation system communications, or other wireless communications.

Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

In the example of FIG. 1, device 10 includes a display such as display 14. Display 14 has been mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 18. Openings may be formed in housing 12 to form communications ports (e.g., an audio jack port, a digital data port, etc.).

Figure 2:
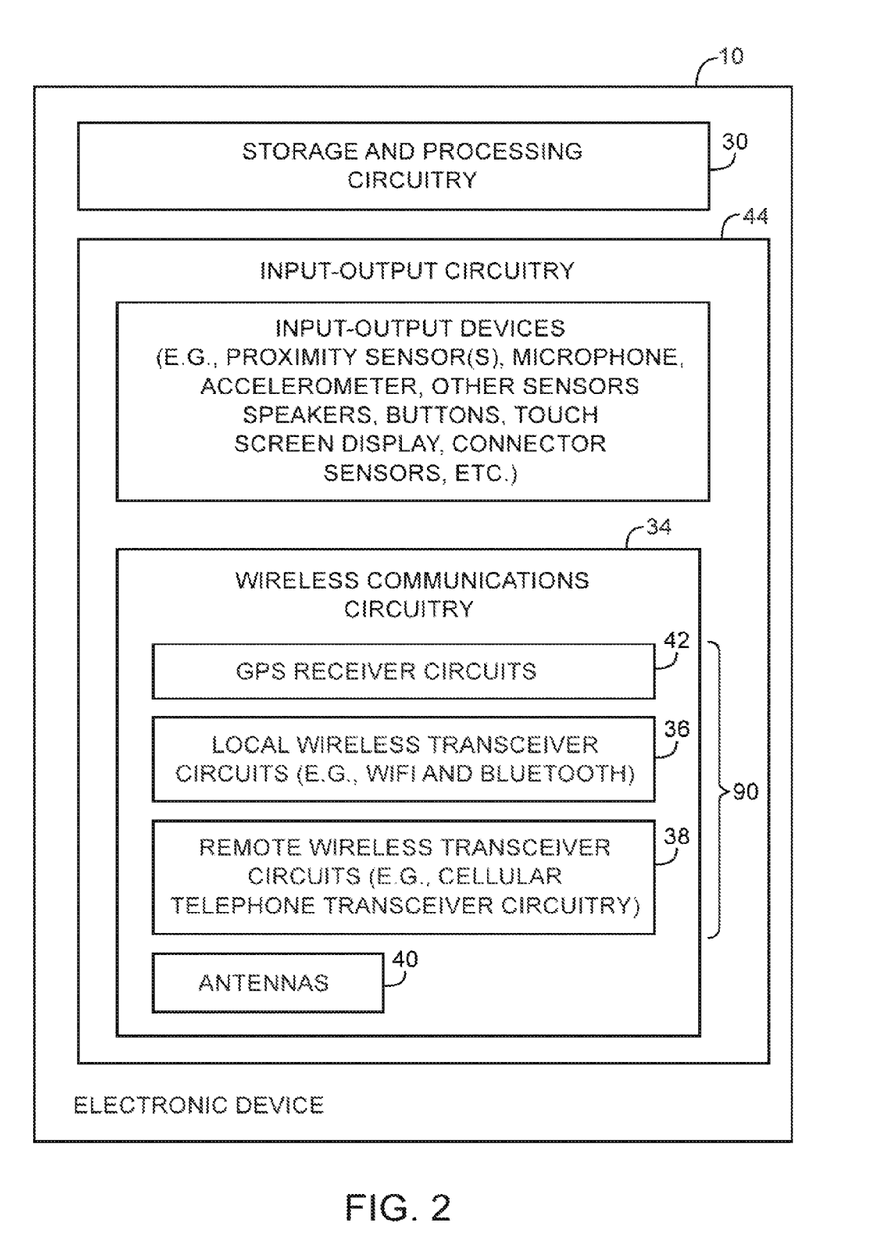
FIG. 2 is a schematic diagram of an illustrative electronic device with wireless communications circuitry in accordance with an embodiment.

A schematic diagram showing illustrative components that may be used in device 10 is shown in FIG. 2. As shown in FIG. 2, device 10 may include control circuitry such as storage and processing circuitry 30. Storage and processing circuitry 30 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 30 may be used to control the operation of device 10. This processing circuitry may be based on one or more microprocessors, microcontrollers, digital signal processors, baseband processor integrated circuits, application specific integrated circuits, etc.

Storage and processing circuitry 30 may be used to run software on device 10, such as internet browsing applications, voice-over-internet-protocol (VOIP) telephone call applications, email applications, media playback applications, operating system functions, etc. To support interactions with external equipment, storage and processing circuitry 30 may be used in implementing communications protocols. Communications protocols that may be implemented using storage and processing circuitry 30 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, etc.

Device 10 may include input-output circuitry 44. Input-output circuitry 44 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors (e.g., a capacitive proximity sensor and/or an infrared proximity sensor), magnetic sensors, connector port sensors that determine whether a connector such as an audio jack and/or digital data connector have been inserted in a connector port in device 10, a connector port sensor or other sensor that determines whether device 10 is mounted in a dock, a connector interface circuit or other circuitry that monitors for the presence of connectors and identifies which type of connector has been plugged in, a sensor that measures a resistor or other circuit in a connector plug that serves as an accessory identifier, other sensors for determining whether device 10 is coupled to an accessory and/or for determining what type of connector and/or other accessory is coupled to device 10, and other sensors and input-output components.

Input-output circuitry 44 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 34 may include transceiver circuitry 36, 38, and 42.

Transceiver circuitry 36 may be wireless local area network transceiver circuitry that may handle 2.4 GHz and 5 GHz bands for WiFi® (IEEE 802.11) communications and that may handle the 2.4 GHz Bluetooth® communications band.

Circuitry 34 may use cellular telephone transceiver circuitry 38 for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples). Circuitry 38 may handle voice data and non-voice data.

Wireless communications circuitry 34 can include circuitry for other short-range and long-range wireless links if desired. For example, wireless communications circuitry 34 may include 60 GHz transceiver circuitry, circuitry for receiving television and radio signals, paging system transceivers, near field communications (NFC) circuitry, etc.

Wireless communications circuitry 34 may include satellite navigation system circuitry such as global positioning system (GPS) receiver circuitry 42 for receiving GPS signals at 1575 MHz or for handling other satellite positioning data. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, hybrids of these designs, etc. If desired, one or more of antennas 40 may be cavity-backed antennas. Different types of antennas may be used for different bands and combinations of bands. For example, one type of antenna may be used in forming a local wireless link antenna and another type of antenna may be used in forming a remote wireless link antenna.

Transmission line paths may be used to couple antenna structures 40 to transceiver circuitry 90. Transmission lines in device 10 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within the transmission lines, if desired.

Device 10 may contain multiple antennas 40. One or more of the antennas may be blocked by a user's body or other external object while one or more other antennas are not blocked. If desired, control circuitry 30 may be used to select an optimum antenna to use in device 10 in real time (e.g., an optimum antenna to transmit signals, etc.). Control circuitry 30 may, for example, make an antenna selection based on information on received signal strength, based on sensor data (e.g., information from a proximity sensor indicating which of multiple antennas may be blocked by an external object), based on tapped antenna signals from a coupler (e.g., antenna impedance information), based on connector usage information, or based on other information.

Figure 3:
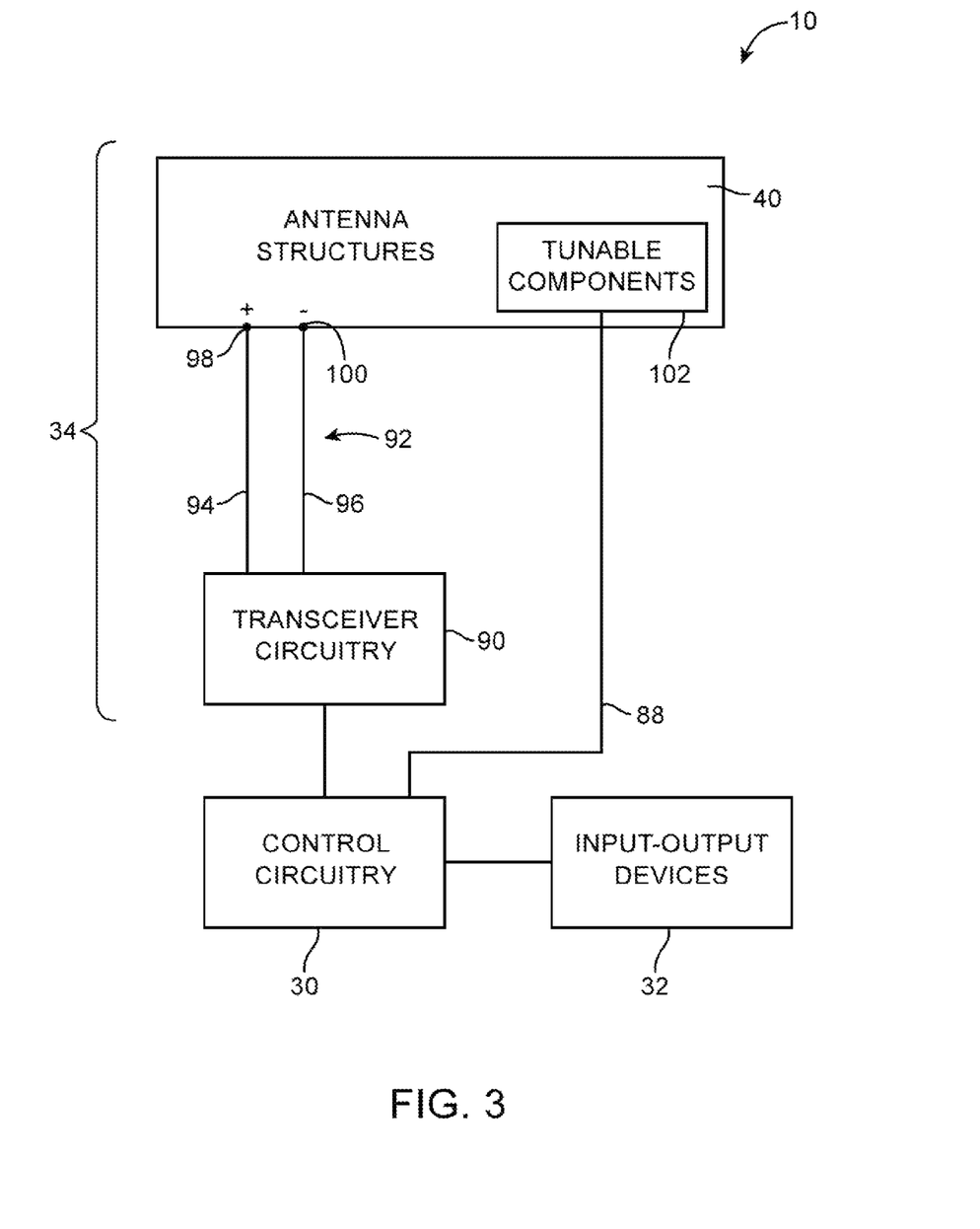
FIG. 3 is a diagram of illustrative wireless circuitry in accordance with an embodiment.

As shown in FIG. 3, transceiver circuitry 90 in wireless circuitry 34 may be coupled to antenna structures 40 using paths such as path 92. Wireless circuitry 34 may be coupled to control circuitry 30. Control circuitry 30 may be coupled to input-output devices 32. Input-output devices 32 may supply output from device 10 and may receive input from sources that are external to device 10.

To provide antenna structures 40 with the ability to cover communications frequencies of interest, antenna structures 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna structures 40 may be provided with adjustable circuits such as tunable components 102 to tune antennas over communications bands of interest. Tunable components 102 may include tunable inductors, tunable capacitors, or other tunable components. Tunable components such as these may be based on switches and networks of fixed components, distributed metal structures that produce associated distributed capacitances and inductances, variable solid state devices for producing variable capacitance and inductance values, tunable filters, or other suitable tunable structures. During operation of device 10, control circuitry 30 may issue control signals on one or more paths such as path 88 that adjust inductance values, capacitance values, or other parameters associated with tunable components 102, thereby tuning antenna structures 40 to cover desired communications bands.

Path 92 may include one or more transmission lines. As an example, signal path 92 of FIG. 3 may be a transmission line having a positive signal conductor such as line 94 and a ground signal conductor such as line 96. Lines 94 and 96 may form parts of a coaxial cable or a microstrip transmission line (as examples). A matching network formed from components such as inductors, resistors, and capacitors may be used in matching the impedance of antenna structures 40 to the impedance of transmission line 92. Matching network components may be provided as discrete components (e.g., surface mount technology components) or may be formed from housing structures, printed circuit board structures, traces on plastic supports, etc. Components such as these may also be used in forming filter circuitry in antenna structures 40. Tunable components 102 may be provided in a matching network to help tune the response of the antenna(s) of device 10. Tunable matching network components may be used to tune an antenna in combination with tunable components that are coupled between an antenna resonating element and ground or may be used separately to tune the frequency response of an antenna.

Transmission line 92 may be coupled to antenna teed structures associated with antenna structures 40. As an example, antenna structures 40 may form an inverted-F antenna, a slot antenna, a hybrid inverted-F slot antenna or other antenna having an antenna feed with a positive antenna feed terminal such as terminal 98 and a ground antenna feed terminal such as ground antenna feed terminal 100. Positive transmission line conductor 94 may be coupled to positive antenna feed terminal 98 and ground transmission line conductor 96 may be coupled to ground antenna feed terminal 92. Other types of antenna feed arrangements may be used if desired. The illustrative feeding configuration of FIG. 3 is merely illustrative.

Figure 4:
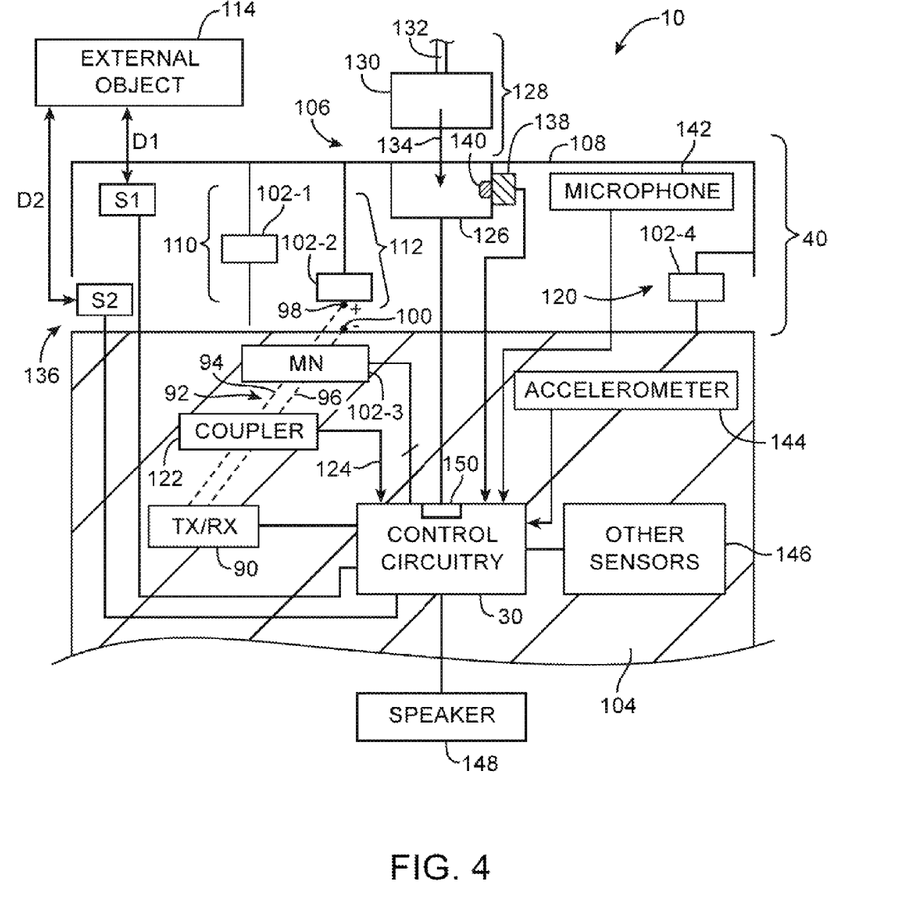
FIG. 4 is a diagram of a portion of an electronic device with circuitry that may be used to gather antenna signals and other signals to help determine how to adjust wireless circuitry in accordance with an embodiment.

FIG. 4 is a diagram of wireless circuitry in an illustrative configuration for electronic device 10. In the example of FIG. 4, antenna structures 40 are based on an inverted-F antenna. This is merely illustrative. In general, antenna structures 40 may be based on any suitable antenna type (slot, inverted-F, planar inverted-F, loop, hybrid slot and inverted-F, other types of antennas, and hybrids based on multiple antenna structures such as these).

As shown in FIG. 4, inverted-F antenna 40 of FIG. 4 has antenna resonating element 106 and antenna ground (ground plane) 104. Antenna resonating element 106 may have a main resonating element arm such as arm 108. Arm 108 may have multiple branches (e.g., a short branch for supporting a high band resonance and a long branch for supporting a low band resonance). The size of arm 108 (e.g., the lengths of the branches of arm 108) may be selected so that antenna 40 resonates at desired operating frequencies.

Main resonating element arm 108 may be coupled to ground 104 by return path 110. Antenna feed 112 may include positive antenna feed terminal 98 and ground antenna feed terminal 100 and may run parallel to return path 110 between arm 108 and ground 104.

If desired, antenna 40 may have tunable components. For example, antenna 40 may have tunable components 102-1 in return path 110, tunable components 102-2 in feed path 112, tunable components 102-3 in a matching network interposed in transmission line path 92, and/or tunable components 102-4 in an additional antenna path such as illustrative path 120 coupled between resonating element arm 108 and ground 104. Tunable component(s) 102-1, 102-2, 102-3, and 102,4 may include adjustable inductors, adjustable capacitors, and/or other adjustable components. By adjusting components 102-1, 102-2, 102-3, and 102-4, the impedance of antenna 40 and matching circuit 102-3 and therefore the frequency response of antenna 40 may be tuned.

Antennas such as antenna 40 of FIG. 4 may be affected by the presence of nearby objects. For example, an antenna may exhibit an expected frequency response when device 10 is operated in free space in the absence of nearby external objects such as external object 114, but may exhibit a different frequency response when device 10 is operated in the presence of external object 114. The magnitude of the distance between external object 114 and antenna 40 may also influence antenna performance.

External objects such as object 114 may include a user's body (e.g., a user's head, a user's leg, or other user body part), may include a table or other inanimate object on which device 10 is resting, may include dielectric objects, may include conductive objects, and/or may include other objects that affect wireless performance (e.g., by loading antenna 40 in device 10 and thereby affecting antenna impedance for antenna 40).

When an external object such as object 114 is brought into the vicinity of antenna 40 (e.g., when object 114 is within 10 cm of antenna 40, when object 114 is within 1 cm of antenna 40, when object 114 is within 1 mm of antenna 40, or when the distance between antenna 40 and object 114 has other suitable values), antenna 40 may exhibit an altered frequency response (e.g., antenna 40 may be detuned because the impedance of the antenna has been changed due to loading from object 114).

Antenna 40 can also be detuned due to the presence of an external connector that has been plugged into device 10. Device 10 may have one or more internal connectors such as connector 126. Connectors such as connector 126 may be digital data port connectors, audio jack connectors, or other connectors for receiving external connectors. A corresponding mating external connector such as connector 130 in accessory 128 may mate with connector 126. Accessory 128 may be electronic equipment that includes a dock connector, may be a headset or other device with an audio cable coupled to an audio plug, may be a cable having a wired portion such as portion 132 that is terminated with a connector such as connector 130, may be audio equipment, or may be other equipment handling analog and/or digital signals.

Connectors such as external connector 130 may contain conductive structures (e.g., contacts, metal shielding, and other metal structures) that can detune antenna 40 when present in mating connector 126. When connector 130 is not plugged into connector 126, antenna 40 may exhibit its desired frequency response. When connector 130 is plugged into antenna 40, however, the frequency response of antenna 40 may be altered due to the presence of the conductive structures of connector 130.

Antenna detuning due to environmental effects such as the presence of external object 114 and/or the presence of connectors such as connector 130 can be addressed by actively adjusting tunable components 102-1, 102-2, 102-3, and 102-4. The adjustments of these components can compensate for detuning due to the object 114 and/or connector 130.

Antenna adjustments can be made by control circuitry 30 based on knowledge of the current operating state of device 10, based on sensor data, based on connector usage information, and/or based on antenna feedback from coupler 122.

Coupler 122 may be used to tap antenna signals flowing to and from antenna 40. Tapped antenna signals from coupler 122 may be processed using a receiver or other circuitry associated with control circuitry 124. Using phase and magnitude information from the antenna signals on path 124, device 10 (e.g., control circuitry 30) may determine the impedance of antenna 40 during the operation of wireless circuitry 34.

Sensors may also be used in device 10 to determine the operating environment of device 10. As an example, device 10 may include proximity sensors such as sensor S1 and sensor S2. Proximity sensors such as sensor S1 and S2 may be capacitive proximity sensors or light-based proximity sensors (as examples). In the illustrative configuration of FIG. 4, proximity sensor S1 has been placed in a first location in antenna 40 (e.g., a location adjacent to resonating element arm 108) and proximity sensor S1 has been placed in a second location in antenna 40 (e.g., adjacent to gap 136 between arm 108 and ground 104). Sensor S1 and sensor S2 may supply sensor data to control circuitry 30. For example, sensor S1 may supply data indicating that external object 114 is at a distance D1 from sensor S1, whereas sensor S2 may supply data indicating that external object 114 is at a distance D2 from sensor S1. More than two proximity sensors may be included in device 10 if desired (e.g., at one or more, two or more, or three or more different locations in antenna 40).

If desired, device 10 may have connector sensors such as illustrative connector sensor 138. Connector sensor 138 may have a pressure sensitive switch such as switch 140 or other sensor mechanism (e.g., a light-based sensor, etc.) that detects the presence and absence of connector 130. There may be a respective connector sensor for each connector in device 10 (e.g., a first connector sensor for a digital data port, a second connector sensor for an audio jack port, a third connector sensor for a power port, a fourth connector sensor for a digital data port used for video signals, etc.). Connector presence (and, if desired, connector type) may also be determined using a connector sensor that has been implemented using communications port circuitry in control circuitry 30 (see, e.g., connector port interface circuitry 150 in control circuitry 30). Connector sensors in device 10 may be incapable of discerning differences between different connectors and different types of connectors or may be configured to identify connectors by type. Indentifying features can be incorporated into connectors (e.g., resistors, mechanical features, integrated circuits or other circuitry) and/or may be incorporated into accessories associated with the connectors to help device 10 identify which types of connectors have been plugged into connectors in device 10 such as connector 126.

Sound signals can be gathered using an audio sensor such as microphone 142. Accelerometer 144 may be used to gather signals on the motion of device 10. Other sensors 146 may also be used to gather information.

During operation of device 10, control circuitry 30 can use information on the current operating state of device 10 to determine how to adjust tunable antenna components (e.g., components such as components 102-1, 102-2, 102-3, and/or 102-4) and other wireless circuitry 34. Consider, as an example, a scenario in which a user of device 10 is making a voice telephone call while pressing device housing 12 against the user's head. In this scenario, it may be desirable to limit the maximum transmit power from transceiver circuitry 90. By determining whether the user is using ear speaker 148, control circuitry 30 can determine whether or not transmit power should be limited.

Sensor data such as data from microphone 142 may also reveal information about the operation of device 10. For example, control circuitry 30 may use speaker 148 to emit a tone (e.g., an ultrasonic tone). When device 10 is resting on an inanimate object such as a table, the tone may be transmitted along the surface of the table and can be picked up by microphone 142. When device 10 is resting on a soft object such as the leg of a user, the tone may be absorbed before reaching microphone 142. Microphone signals for microphone 142 may therefore be used to assess the operating environment of device 10.

Motion sensor signals (e.g., data from accelerometer 144) may also reveal information about the current usage of device 10. If, for example, a user of device 10 is carrying device 10 in a pocket or in the user's hand, device 10 may jiggle at a characteristic frequency. Device 10 may exhibit different accelerometer signals when at rest on a table.

Device 10 may contain other sensors such as sensors 146. Sensors 146 may include temperature sensors, visual sensors such as light detectors and image sensors (e.g., camera sensors for front and/or rear cameras), etc. These sensors may determine whether device 10 is being used by a user or is resting on an inanimate object, how device 10 is being held, and/or may convey information about the presence of external objects in the vicinity of device 10. Based on information about the usage scenario for device 10, control circuitry 30 can make wireless circuit adjustments (e.g., to establish an appropriate maximum transmit power for transceiver circuitry 90, to tune antenna 40, etc.).

In addition to determining whether to adjust a maximum transmit power setting for wireless transceiver circuitry 90, control circuitry 30 may determine whether or not to make other adjustments to wireless circuitry 34. For example, control circuitry 30 may use sensor data, information on the current operating state of device 10 (e.g., whether an ear speaker is being used for a voice cellular telephone call), information on the presence of external object 114, information on the presence of connector 130 and/or the connector type of connector 130, and other information in tuning antenna 40, in switching between different communications frequencies, in switching antennas, etc.

When it is determined from tapped antenna signals from coupler 122 or from proximity sensors such as sensors S1 and S2 that antenna 40 has been detuned due to the presence of external object 114 or the presence of connector 130, tunable components 102 may be adjusted to compensate for the detuning. The distances D1 and D2 between external object 114 and respective portions of antenna 40 may be analyzed to determine how antenna 40 has been detuned. If, for example, D1 is greater than D2, antenna 40 may be detuned by a first amount, whereas antenna 40 may be detuned by a second amount if D1 is less than D2. The values of D1 and D2 may therefore be used to tune antenna 40 by an appropriate amount to compensate for detuning.

As another example, the presence of connector 130 in connector 126 of device 10 may detune antenna 40. Control circuitry 30 can use information on the presence of connector 130 (e.g., sensor data from connector sensor 138) and/or antenna impedance information from coupler 122 to determine the amount by which antenna 40 has been detuned due to the presence of connector 130.

When making antenna adjustments, sensors such a sensors S1 and S2 and sensor 138 may provide information that can be used in an open loop fashion to predict how much antenna 40 should be adjusted to compensate for detuning. Feedback from coupler 122 may be used in real time in a closed loop fashion to measure antenna detuning (e.g., to measure antenna impedance to ensure that there is no impedance change that would result in antenna detuning). If desired, both sensor data and antenna impedance data from coupler 122 may be used.

Figure 5:
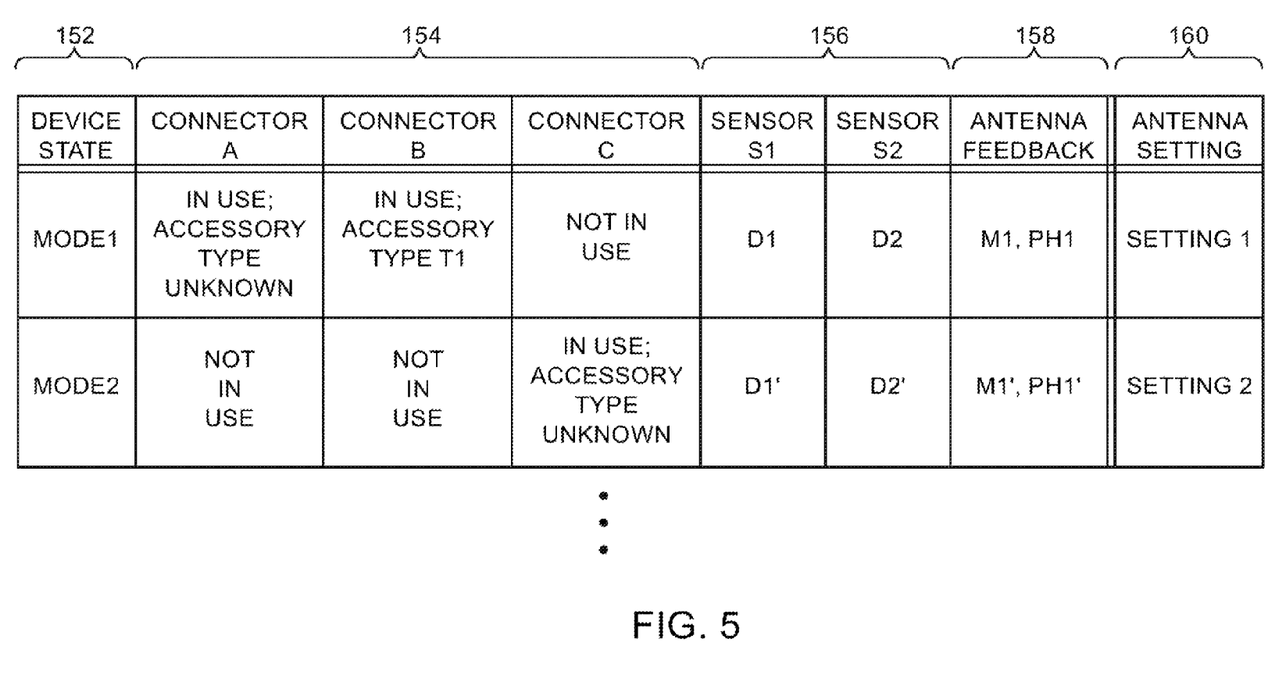
FIG. 5 is a table showing illustrative device operating conditions and associated wireless circuit operating modes in accordance with an embodiment.

FIG. 5 is a table indicating how control circuitry 30 may adjust antenna tuning circuitry such as tunable components 102-1, 102-2, 102-3, and 102-4 during operation of device 10. Control circuitry 30 may supply control signals to tunable components 102-1, 102-2, 102-3, and 102-4 and may make other adjustments to wireless circuitry 34 in real time based on inputs such as inputs 152, 154, 156, and 158. Control circuitry 30 may also adjust device settings related to which wireless communications frequencies are being used, settings for output power (e.g., transmit power), settings for which antenna is being used, etc. Configurations in which antenna tuning is being adjusted based on inputs 152, 154, 156, and 158 are sometimes described herein as an example.

Input 152 may Involve knowledge of the current operating mode of device 10. As a user interacts with device 10, the user may make voice calls, may receive wireless data, and may engage in other activities that influence the operating mode of device 10. Control circuitry 30 can adjust antenna settings 160 based at least partly on information on the current operating mode of device 10. If, for example, device 10 is operating in a mode (e.g., mode1) in which an ear speaker is active and the user is making a voice call, antenna 40 may be tuned using a first setting (e.g., setting 1 as shown in FIG. 5), whereas if device 10 is operating in a mode (e.g., mode2) in which the ear speaker is not active and/or the user is not making a voice call, antenna may be tuned using a second setting (e.g., setting 2 as shown in FIG. 5). Antenna setting 1, in this example, may compensate for antenna loading due to the presence of the user's body in the vicinity of device 10. Transmit power may also be adjusted (e.g., maximum transmit power may be lowered) based on knowledge that the user of device 10 is making a voice call.

In addition to information on the operating mode of device 10 (information 152), control circuitry 30 may use information such as input information 154 on the usage of one or more connectors in device 10 in adjusting antenna 40. Connector status information can be gathered using connector presence sensors such as sensor 138 and/or connector interface circuits such as interface circuit 150.

Antenna performance for antenna 40 (e.g., antenna impedance and therefore antenna tuning) can be affected by the presence or absence of the conductive materials of an external connector in the mating connector receptacle of device 10. The amount of conductive material and the location of the conductive material in an external connector and associated accessory can also affect antenna performance. As a result, information on whether a connector is being used and, if available, more detailed information about the particular type of connector that is being used can be gathered by control circuitry 30. This information on the usage of connectors in device 10 can be processed to help determine how to adjust the tunable circuitry for antenna 40 to compensate for connector-Induced antenna detuning.

Consider, as an example, a con figuration for device 10 in which device 10 has three different internal connectors: connector A, connector B, and connector C each of which is configured to receive a corresponding external connector. In this situation, none, one, two, or all three of the connectors may be used and each connector may be coupled to a potentially different type of accessory. Control circuitry 30 can select an appropriate antenna tuning setting for antenna 40 based on information on which connectors are in active use and/or information on which types of accessories (i.e., which type of mating external connectors) are in use. In the first row of the illustrative table of FIG. 5, connector A is in use and has been mated to a connector from an external accessory of unknown type, connector B is in use and has been coupled to an accessory connector of type T1, and connector C is not in use (i.e., no external connectors have been plugged into connector C in device 10). In the example of the second row of the illustrative table of FIG. 5, connectors A and B are not being used, but a connector of an unknown type has been plugged into connector C of device 10. In the scenario of the first row, control circuitry 30 has adjusted components 102-1, 102-2, 102-3, and 102-4 to place antenna 40 in a first state (setting 1), whereas in the scenario of the second row, the antenna settings have been placed in a second state (setting 2). Settings 1 and 2 optimize antenna performance to ensure that the antenna exhibits a desired frequency response even in the presence of plugged in connectors that might otherwise disrupt normal antenna operation.

Information 156 (e.g., sensor data from one or more sensors in device 10) can also be used in adjusting antenna 40. As an example, control circuitry 30 may gather information from a temperature sensor (to indicate whether or not device 10 is being gripped by a warm hand of a user), an accelerometer (to indicate whether or not device 10 is being held by a user), a microphone (to indicate the presence or absence of an inanimate object such as a table surface), etc. Proximity sensor data from one or more sensors can also be used. For example, proximity sensors such as illustrative sensors S1 and S2 may be used to identify whether one or more different portions of antenna 40 are being touched or otherwise loaded by a user's hand or other body part. Proximity sensor data from sensors such as sensors S1 and S2 may indicate the distance at which external object 114 (e.g., a user's hand or other body part or other external object) is located from each sensor (e.g., distances D1 and D2 in the scenario of the first row of the table of FIG. 5 and distances D1' and D2' in the scenario of the second row of the table of FIG. 5). In one position, object 114 may detune antenna 40 in a way that can be compensated using a first antenna setting, whereas in another position, object 114 may detune antenna 40 in a way that can be compensated using a second antenna setting.

Antenna feedback 158 may also be used by control circuitry 30 in adjusting antenna 40. Information on antenna impedance for antenna 40 (e.g., antenna feedback 158 such as magnitude and phase information on tapped antenna signals from coupler 122) may indicate in real time how much antenna 40 has been loaded by object 114. Based on information 158, control circuitry 30 can determine how to tune the adjustable components for antenna 40 to compensate for detuning due to the loading of object 114. Information such as each of inputs 152, 154, 156, and 158 can be used in isolation, can be used in conjunction with additional information, and/or can be used in combination (e.g., one or more of inputs 152, 154, 156, and 158 can be used in combination to determine antenna setting 160 for antenna 40, two or more of these inputs can be used, three or more of these inputs can be used, or all four of these inputs can be used in determining antenna, setting 160). Other wireless settings (operating frequency, transmit power, currently active antenna, etc.) can also be adjusted based on one or more of these inputs, if desired.

Figure 6:
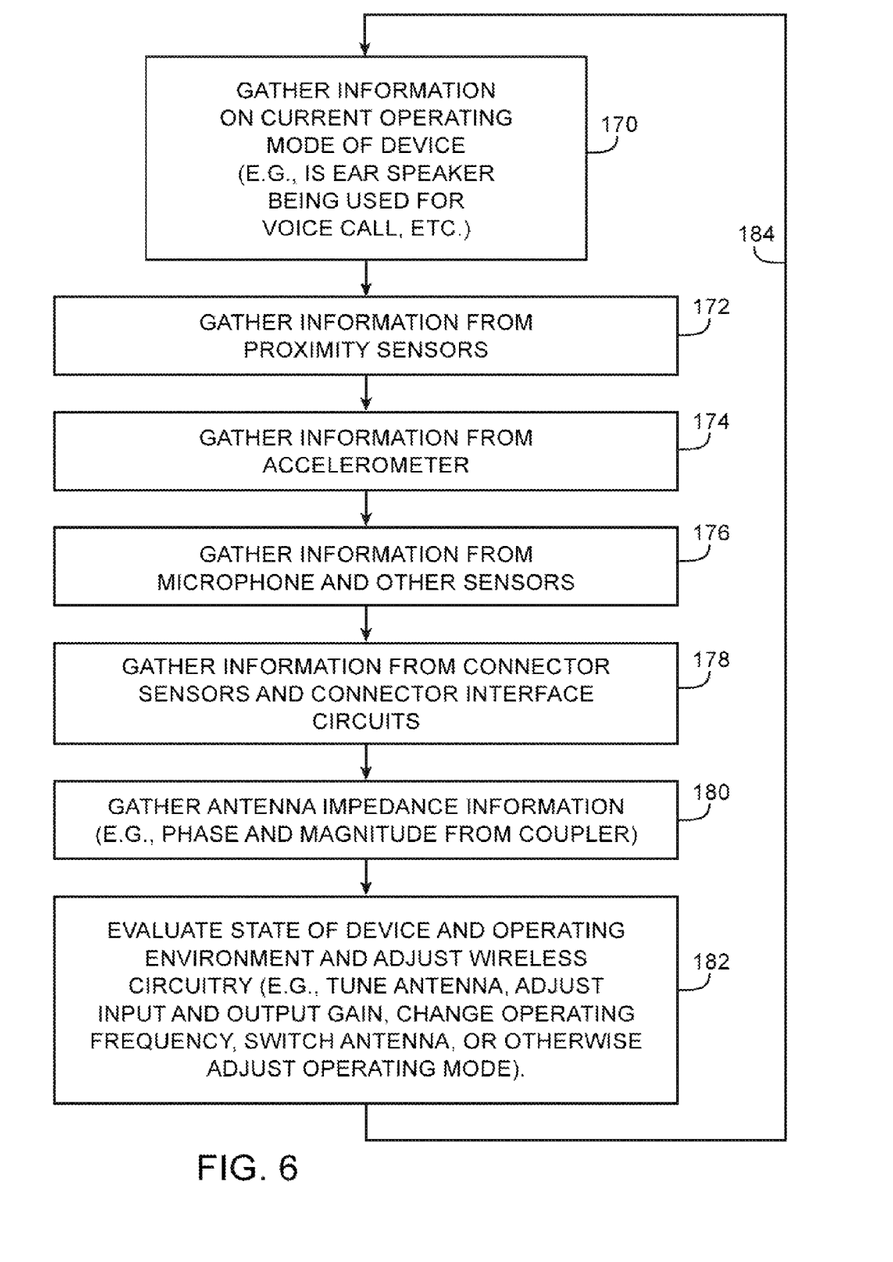
FIG. 6 is a flow chart of illustrative steps involved in gathering connector presence data and other information in an electronic device and in making corresponding wireless circuit adjustments in accordance with an embodiment.

FIG. 6 is a flow chart of illustrative steps involved in controlling the operation of device 10 using circuitry 30.

At step 170, control circuitry 30 may gather information on the current operating state of device 10. For example, control circuitry 30 may gather information 152 such as information on which communications frequency is active, which type of information is being conveyed (e.g., voice), information on which speaker(s) may be active in device 10, etc.

At step 172, control circuitry 30 may gather information 156 from sensors such as proximity sensors S1 and S2. If desired, fewer proximity sensors may be used or more proximity sensors may be used. Proximity sensor data may reveal the distance of external objects such as object 114 to each sensor. This proximity data may reveal whether or not an external object will affect wireless operations for device 10 (e.g., how antenna 40 will be detuned unless tuning adjustments are made).

At step 174, control circuitry 30 may gather accelerometer data from accelerometer 144. Accelerometer data may reveal whether device 10 is being held by a user or is resting on an inanimate object. Orientation information indicating whether device 10 is in portrait or landscape mode or is otherwise positioned in a particular way can be obtained using accelerometer 144.

At step 176, control circuitry 30 may gather information from audio sensor equipment such as microphone 142. Microphone data may be gathered at the same time that control circuitry 30 uses an audio source such as speaker 148 to generate a known acoustic signal (e.g., an ultrasonic tone) and may reveal information about the surroundings of device 10. Other sensor data can also be gathered using other sensors 146.

At step 178, control circuitry 30 may gather information 154 from connector sensors such as connector sensor 138 and connector interface circuitry 150 to determine which connector(s) are plugged into connectors in device 10. Information on which type of connector is being mated with each connector in device 10 may also be gathered. For example, an audio jack may be configured to receive two different types of audio plug. A first of the audio plugs may not affect antenna operation. When a plug of this type is detected, no antenna tuning operations need be performed. A second of the audio plugs may detune antenna 40. Accordingly, when a plug of this type is detected, control circuitry 30 may tune antenna 40 to compensate.

At step 180, antenna impedance information 158 can be gathered for antenna 40 using coupler 122. Antenna impedance information, information on which connectors are active, and information on which types of external connectors have been plugged into device 10, may reveal how much antenna 40 has been detuned from its desired tuning. Proximity sensor information, information on the current operating mode for device 10, accelerometer data, and data form other sensors may also inform control circuitry 30 on the nature of any antenna loading and detuning.

At step 182, based on the information gathered at step 170, 172, 174, 176, 178, and 180 and, if desired, other information, device 10 can use control circuitry 30 to adjust wireless circuitry 34. For example, control circuitry 30 may increase or decrease the current maximum transmit power for a transmitter in transceiver circuitry 90, may switch antennas, may adjust transmit frequency, and may tune antenna 40 by adjusting adjustable antenna circuits such as tunable components 102-1, 102-2, 102-3, and 102-4. As indicated by line 184, processing may then loop back to step 170. The processes of FIG. 6 may be performed continuously while wireless, circuitry 34 is being used in device 10, so that antenna 40 remains tuned and so that other wireless circuitry settings are maintained at optimal values.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
   an antenna;
   wireless radio-frequency transceiver circuitry that transmits radio-frequency signals through the antenna;
   a tunable component that tunes the antenna, wherein the tunable component comprises a tunable component selected from the group consisting of: an adjustable capacitor and an adjustable inductor;
   a connector that is configured to receive an external connector; and
   control circuitry that tunes the tunable component to tune the antenna based on information about use of the connector, wherein the information about the use of the connector comprises information indicating whether the external connector has been plugged into the connector.

2. The electronic device defined in claim 1 further comprising:
   a connector sensor that senses whether the external connector has been plugged into the connector, wherein the control circuitry is coupled to the connector sensor, and wherein the information about the use of the connector comprises information from the connector sensor.

3. The electronic device defined in claim 1 further comprising:
   a connector interface in the control circuitry, wherein the connector interface senses whether the external connector has been plugged into the connector and wherein the information about the use of the connector comprises information from the connector interface.

4. The electronic device defined in claim 1 further comprising:
   first and second proximity sensors responsive to the presence of external objects in the vicinity of the antenna, wherein the control circuitry tunes the tunable component to tune the antenna based on data from the first proximity sensor and based on data from the second proximity sensor.

5. The electronic device defined in claim 4 further comprising a connector sensor that senses whether the external connector has been plugged into the connector, wherein the control circuitry is coupled to the connector sensor, and wherein the information about the use of the connector comprises information from the connector sensor indicating whether the external connector has been plugged into the connector.

6. The electronic device defined in claim 4 wherein the information about the use of the connector comprises connector type information for the external connector and wherein the control circuitry tunes the tunable component based on the connector type information.

7. The electronic device defined in claim 1 further comprising:
   a coupler that is interposed between the antenna and the wireless radio-frequency transceiver circuitry, wherein the control circuitry uses the coupler to gather antenna impedance information on the antenna, and wherein the control circuitry tunes the tunable component to tune the antenna based on the antenna impedance information.

8. The electronic device defined in claim 7 further comprising:
   a connector interface in the control circuitry, wherein the connector interface senses whether the external connector has been plugged into the connector and wherein the information about the use of the connector comprises information from the connector interface indicating whether the external connector has been plugged into the connector.

9. The electronic device defined in claim 1, wherein the tunable component comprises an adjustable capacitor and wherein the control circuitry tunes the adjustable capacitor based on the information indicating whether the external connector has been plugged into the connector.

10. The electronic device defined in claim 1, wherein the tunable component comprises an adjustable inductor and wherein the control circuitry tunes the adjustable inductor based on the information indicating whether the external connector has been plugged into the connector.

11. An electronic device, comprising:
    an antenna;
    wireless radio-frequency transceiver circuitry that transmits radio-frequency signals through the antenna;
    a tunable component that tunes the antenna;
    a connector that is configured to receive an external connector; and
    control circuitry that tunes the tunable component to tune the antenna based on information about use of the connector, wherein the information about the use of the connector comprises connector type information for the external connector and wherein the control circuitry is configured to tune the tunable component based on the connector type information.

12. The electronic device defined in claim 11 further comprising:
    a coupler that is interposed between the antenna and the wireless radio-frequency transceiver circuitry, wherein the control circuitry uses the coupler to gather antenna impedance information on the antenna, and wherein the control circuitry tunes the tunable component to tune the antenna based on the antenna impedance information.

13. The electronic device defined in claim 12 further comprising:
    a proximity sensor that generates proximity sensor data indicative of whether an external object is within the vicinity of the antenna, wherein the control circuitry tunes the tunable component to tune the antenna based on the proximity sensor data.

14. A method of adjusting an antenna in an electronic device, comprising:
    with control circuitry in the electronic device, gathering information on whether an external connector has been plugged into the electronic device;
    with the control circuitry, measuring an antenna impedance for the antenna using signals from a coupler; and
    with the control circuitry, adjusting a tunable component to tune the antenna based on the information on whether the external connector has been plugged into the electronic device and based on the measured antenna impedance.

15. The method defined in claim 14 further comprising:
gathering proximity sensor data with a proximity sensor in the electronic device; and
adjusting the tunable component based on the proximity sensor data.

16. The method defined in claim 14 further comprising:
determining which type of external connector has been plugged into the electronic device; and
adjusting a tunable component to tune the antenna based on which type of external connector has been plugged into the electronic device.

17. The method defined in claim 14 further comprising:
gathering sensor data from a sensor in the electronic device; and
with the control circuitry, adjusting the tunable component based at least partly on the sensor data.

18. A method of adjusting an antenna in an electronic device, comprising:
with control circuitry in the electronic device, gathering information on whether an external connector has been plugged into the electronic device;
with the control circuitry, measuring an antenna impedance for the antenna using signals from a coupler;
with the control circuitry, adjusting a tunable component to tune the antenna based on the information on whether the external connector has been plugged into the electronic device and based on the measured antenna impedance;
gathering accelerometer data with an accelerometer in the electronic device; and
adjusting the tunable component based on the accelerometer data.

19. The method defined in claim 18 wherein the electronic device includes a connector sensor that senses whether the external connector has been plugged into the electronic device and wherein gathering the information on whether the external connector has been plugged into the electronic device comprises using the connector sensor to determine whether the external connector has been plugged into the electronic device.

* * * * *